(12) United States Patent
Michaels et al.

(10) Patent No.: US 8,920,983 B2
(45) Date of Patent: Dec. 30, 2014

(54) MICROBIAL FUEL CELL AERATOR

(76) Inventors: Anthony F. Michaels, Palos Verdes Estates, CA (US); Kenneth H. Nealson, Los Angeles, CA (US); Patrick Michaels, Palos Verdes Estates, CA (US); Yuelong Huang, Gainesville, FL (US)

(*) Notice: Subject to any disclaimer, the term of this patent is extended or adjusted under 35 U.S.C. 154(b) by 103 days.

(21) Appl. No.: 13/557,006

(22) Filed: Jul. 24, 2012

(65) Prior Publication Data

US 2013/0048574 A1 Feb. 28, 2013

Related U.S. Application Data

(60) Provisional application No. 61/511,506, filed on Jul. 25, 2011.

(51) Int. Cl.
*H01M 8/16* (2006.01)
(52) U.S. Cl.
CPC ............... *H01M 8/16* (2013.01); *Y02E 60/527* (2013.01)
USPC ............................................. 429/401; 429/2
(58) Field of Classification Search
CPC ........................................................ H01M 8/16
USPC ...................................................... 429/2, 401
See application file for complete search history.

(56) References Cited

U.S. PATENT DOCUMENTS

| | | | | |
|---|---|---|---|---|
| 4,765,501 A | * | 8/1988 | Kao | .............................. 220/4.21 |
| 2004/0241528 A1 | * | 12/2004 | Chiao et al. | ..................... 429/43 |
| 2005/0007042 A1 | | 1/2005 | Moore et al. | |
| 2007/0048577 A1 | * | 3/2007 | Ringeisen et al. | .............. 429/30 |
| 2007/0062820 A1 | | 3/2007 | Smotkin | |
| 2007/0256236 A1 | * | 11/2007 | Switzer | .............................. 4/626 |
| 2008/0292912 A1 | * | 11/2008 | Logan et al. | ...................... 429/2 |
| 2009/0197124 A1 | * | 8/2009 | Burke et al. | ....................... 429/2 |
| 2009/0305085 A1 | * | 12/2009 | Crookes et al. | ................... 429/2 |

FOREIGN PATENT DOCUMENTS

WO  WO 2009/076505 A1  6/2009

OTHER PUBLICATIONS

Liu et al., "Electricity Generation Using an Air-Cathode Single Chamber Microbial Fuel Cell in the Presence and Absence of a Proton Exchange Membrane", Environ. Sci. Technol. (38), 2004, pp. 4040-4046.*
Cha, Jaehwan et al., Directly Applicable Microbial Fuel Cells in Aeration Tank for Wastewater Treatment, Bioelectrochemistry, vol. 78, pp. 72-79, Apr. 2010, Abstract Only, 1 pg.
International Search Report dated Dec. 28, 2012, for PCT/US2012/048011, 3 pgs.

* cited by examiner

*Primary Examiner* — Gregg Cantelmo
(74) *Attorney, Agent, or Firm* — Christie, Parker & Hale, LLP

(57) ABSTRACT

A device for mixing and aerating a body of water, the device includes a microbial fuel cell comprising an anode and a cathode; an electricity management subsystem electrically connecting the anode and the cathode; and a mixing subsystem electrically connected to the electricity management subsystem. The device can be used to mix or aerate a body of water containing organic material while simultaneously reducing the requirements for aeration. The body of water may provide organic material to the microbial fuel cell to produce electricity to power the mixing subsystem.

10 Claims, 7 Drawing Sheets

MICROBIAL FUEL CELL AERATOR

CROSS-REFERENCE TO RELATED APPLICATION(S)

The present application claims priority to and the benefit of Provisional Application No. 61/511,506, filed Jul. 25, 2011, entitled "MICROBIAL FUEL CELL AERATOR", the entire content of which is incorporated herein by reference.

FIELD

The present invention relates to a device to improve the mixing and aeration of industrial, agricultural and waste treatment ponds. In particular, the device relates to a microbial fuel cell configured to produce energy to power a mixer or aerator with a synergistic feedback to the biological oxygen demand of the water body.

BACKGROUND

Aeration, the process of purposely exchanging gases between the atmosphere and water, is a required aspect of many different biological, engineering and social systems. Most commonly, aeration is required to either add a gas to water when its absence compromises a desired outcome or removing a gas from water when its surplus is similarly unwanted. In both cases, engineers have created a wide variety of technologies to accomplish these tasks. Most involve physical manipulations of the physics of air-water gas exchange to enhance the exchange rate as well as clever innovations to increase the effectiveness or reduce the costs. Some of these approaches also directly influence the need for aeration.

Although the dynamics of many different gases can require enhanced rates of air-water gas exchange, one common application is the requirement for oxygen in waters that must support life. Photosynthesis, the basis of nearly all life on earth, uses sunlight energy to create the chemical bonds in organic material. Whether on land or in water, photosynthetic organisms transform carbon dioxide into organic material and use water as a source of electrons, thus making gaseous oxygen as a by-product of the water-splitting reaction. Animals and bacteria, commonly called heterotrophic organisms, use this organic material as a source of energy for their metabolism. In the process, they excrete carbon dioxide. They also must find a terminal electron acceptor for the electron transport chain in respiration. Many organisms use oxygen for this purpose, thereby re-creating pure water, while some micro-organisms can use a variety of metals as the terminal electron acceptor.

The balance of oxygen production and oxygen respiration in any ecosystem determines the net changes in the constituents that are involved in the processes. Excess photosynthesis over respiration can lead to a buildup of organic material and oxygen and a decline in carbon dioxide and nutrients. Systems that have inputs of large amounts of exogenous organic material can support the growth of stable populations of organisms, but the oxygen content, or that of any other electron acceptors, will steadily decline. The state of any system will be a function of these kinds of balances over any specific time and space scale.

For example, sewage treatment plants bring in large amounts of organic waste from urban environments with water as the carrier and break that waste down to inorganic nutrients as part of making the water safer for discharge back into the environment. This is usually done by growing micro-organisms on the organic waste to reduce the "Biological Oxygen Demand" ("BOD"). BOD is a short-hand measure for how much oxygen would be required to allow these organisms to aerobically metabolize all of the organic wastes to inorganic nutrients. Since these systems have an exogenous supply of organics, they generally require an exogenous source of oxygen. Typically, this is supplied by adding oxygen directly to the water carrying the organic waste, either through enhanced gas exchange with the oxygen in the atmosphere or through direct injection of pure oxygen.

Other managed water bodies have a related dynamic. Fish farms have a large organic loading through the feed that is added to the ponds to support the growth and metabolism of the fish. Both unused feed and fish wastes stimulate the growth of bacteria and other micro-organisms. Similarly, many man-made bodies of water have large organic loadings, including the ponds at golf-courses, small fishing lakes near farms, harbors, waste ponds near agricultural food processing plants and many others. All of these have a similar issue. The pond may become anoxic if the oxygen drops too low, which may bring negative consequences. In the fish ponds or lakes, the fish and other large animals will die. In some of these, the anoxic ponds release noxious and foul smelling gases that make them an eyesore and nuisance.

Natural bodies of water also show similar dynamics. When organic loadings are high, the scenarios are similar to the fish ponds. However, natural bodies also can have unfortunate responses to the addition of inorganic nutrients from either natural sources, for example upwelling, or manmade, for example nutrient discharge. In these cases, large populations of plants and algae will grow in a process called eutrophication. As these populations of plants use up the nutrients, the organic biomass sinks out and is subsequently consumed. While the plants are growing near the surface, they make extra oxygen which outgases to the atmosphere. As the organic material decays, it consumes oxygen until the dissolved oxygen is gone and the system becomes anaerobic. This can lead to dead-zones and other harmful ecosystem effects. These also tend to occur on spatial scales that are much too large for an effective engineering response after the organic material is present. Sometimes humans can influence the original source of inorganic nutrients, such as removing phosphates from detergents or reducing nutrient runoff from farms. However, sometimes eutrophication cannot be avoided.

While these examples are primarily centered on oxygen balance issues, there are other instances when enhanced gas exchange can be required. Large amounts of respiration will raise the amount of carbon dioxide in the water and its removal can be advantageous in some cases. Conversely, growing algae or other aquatic plants actually requires carbon dioxide as a nutrient and it must be added if the rate of growth exceeds the ability of the ecosystem to supply it naturally.

In most cases where there is too little oxygen, or too little or too much of any other gas, it is because the internal dynamics of the water exceed the natural rate of gas exchange between water and air. The typical response is to increase the rate of gas exchange through one of a variety of methods. Gas exchange rate is governed by a complex set of physical and chemical processes that are fairly well known. In general, the rate is a function of the surface area of the air-water interface, the concentration difference of the gases at the surface as indicated by their partial pressures and the mixing of water and air away from this surface to homogenize with the concentrations in the wider body of water.

Enhancements to gas exchange rate generally involve a wide variety of technologies and engineered solutions that increase the concentration gradient, increase the surface area and increase the turbulent mixing away from the interface. The simplest of these involve some combination of splashing and bubbling. Splashing puts drops of water into the air, increasing the effective amount of surface area and mixing the drops with the wider body of water on impact. Bubbling puts small bubbles in the water, again increasing surface area and, since bubbles rise, aiding in mixing. In both cases, increasing the gradient can be done either by careful choice of timing and location for the splashing/bubbling to ensure that the concentrations in the water and air are as different as possible, for example drawing water from the bottom of a pond or at night when the oxygen is lowest, or by using gas mixtures that have a higher content of the gas of interest, for example pure oxygen or CO2.

These traditional aeration techniques are generally effective. However, they are also quite expensive in terms of their energy requirements. Physical methods generally require a lot of energy to move water and air. This energy is typically supplied by electricity produced by the combustion of fossil fuels, whose volatile prices are ever increasing. Making pure gas mixtures is even more expensive. Thus, as fossil fuel and energy prices rise and as the world discusses the consequences of the emission of fossil fuel carbon dioxide, the price component of aeration begins to take a significant role in understanding the sustainability of various human practices. Technologies that can reduce these costs should have a positive impact on many human activities and businesses at the same time as they have a positive effect on the planet.

SUMMARY

The invention relates to a microbial fuel cell aerator ("MFCA"), a device for providing low-cost, low-carbon-emission aeration to organic-rich waters. The MFCA takes advantage of the unique characteristics of a microbial fuel cell ("MFC") for providing renewable power through waste treatment and adapts the MFC to also reduce the oxygen demand of a pond. The energy provided by the MFC is then used to power the desired aeration or mixing method, including, but not limited to, traditional splashing or bubbling mechanisms. The combination of these approaches reduces the fossil-fuel electricity requirements for aeration to reduce the carbon emission, reduces the amount of aeration that must be done and reduces the installation costs of the system.

DETAILED DESCRIPTION

The detailed description set forth below in connection with the appended drawings is intended as a description of the presently preferred embodiments of a microbial fuel cell aerator provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere here, like element numbers are intended to indicate like elements or features.

Figure 1:
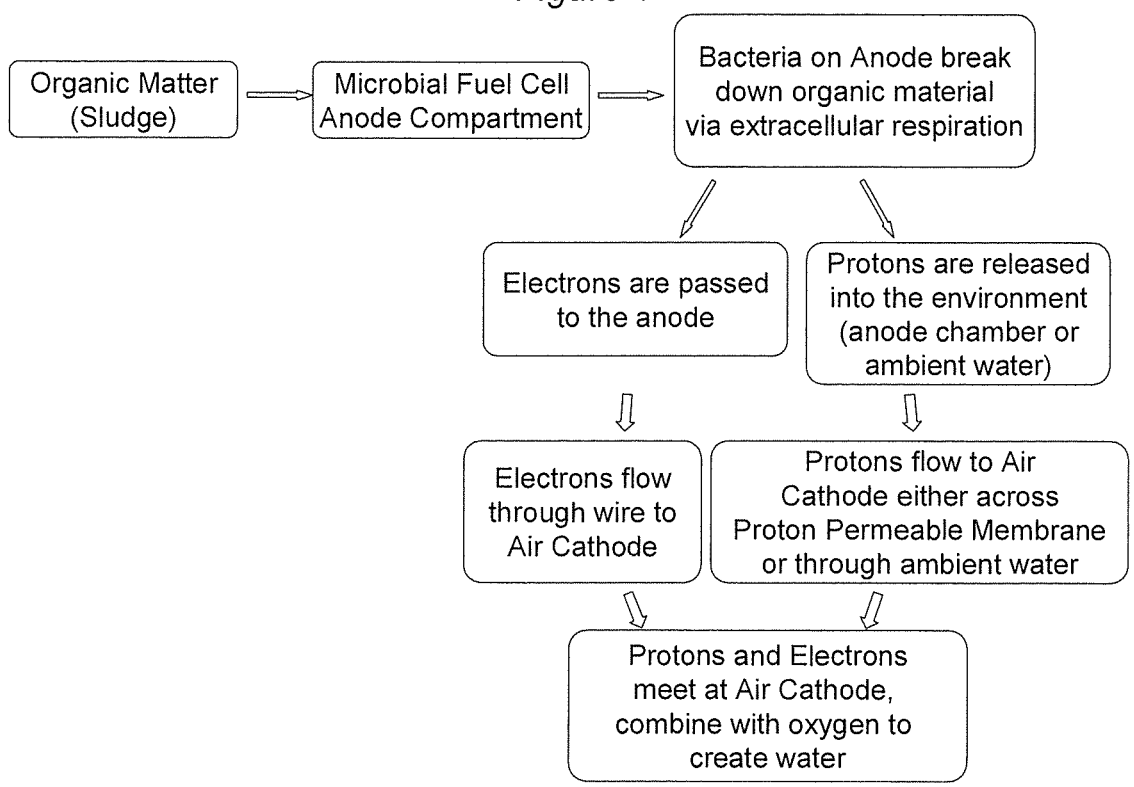
FIG. 1 is a generic flow diagram for a microbial fuel cell showing the process of converting organic matter to electricity.

A microbial fuel cell ("MFC") is an established technology at the small laboratory scale that is only now being scaled up to meet commercial and municipal requirements. This technology basically works by inserting a wire into the metabolism of bacteria. As shown in FIG. 1, specific bacteria are grown on the surface of an anode. Organic rich, oxygen depleted waters are passed over the anode and the bacteria break down the organic material through extracellular digestion. In this process, the bacteria transport electrons across their intracellular membranes to do cellular work. These special bacteria then pass the electron to the anode as a terminal electron acceptor. The anode chamber is separated from a cathode chamber by a proton-permeable membrane or by an appropriate distance through the water. The anode is connected to the cathode by a wire and the electron flow through the wire provides an electrical current. At the cathode, the electrons combine with protons and oxygen to form pure water. Alternate electron acceptors are possible at the cathode.

The membrane fuel cell aerator ("MFCA") modifies an MFC to run on the organic material in a body of water and produce electricity while also respiring some of that organic material to inorganic nutrients while at the same time using the energy to further enhance gas exchange and mixing in a way that is synergistic with the performance of the MFCA. The MFC provides a renewable energy source with limited carbon emissions, and therefore a small carbon footprint. At the same time, the activities of the MFC respire some of the organic material without using oxygen from the water itself. By transferring the electrons to an air-cathode, in which the cathode is exposed to atmospheric oxygen, this aquatic respiration is accomplished directly from the air rather than from the oxygen dissolved in the water. This effectively reduces the biological oxygen demand ("BOD") of the water and is a direct substitute for some of the energy that would have been required to aerate the water to meet that BOD requirement. Thus, less energy is required and the balance is supplied by a renewable source, the very organic material whose respiration requires oxygen. The electricity is used to mix water or further enhance gas exchange and the choices of locations of the mixing and anode feedback to enhance the effectiveness of the electron uptake on the anode of the MFC.

The microbial fuel cell based aeration approach described here creates a novel solution to the cost-effective aeration of aquaculture operations by combining microbial fuel cells and electricity-powered aeration systems. This combination reduces the demand for gas exchange, cleans the water and provides a source of renewable energy for traditional aeration in a device that can either be integrated into the pond or be a free-floating or free-standing installation. The combination is a green, cost-effective replacement for traditional aeration in many applications with special relevance to aquaculture.

The MFCA utilizes a renewable energy source for the energy requirements of the aeration and gas management system. This energy source is the dissolved and fine particulate organic material in the water whose respiration is creating an oxygen demand. This form of energy is produced with little emission of fossil fuel carbon dioxide. The potential source of this energy is directly related to the amount of organic material in the pond. As it declines, so does the requirement for aeration. As it increases, so does the aeration demand. Thus, the dynamics of the source of energy and the requirement for it are linked.

The unique form of respiration in an MFC, accomplished by an air-cathode in this device, effectively allows some of the oxygen in the atmosphere to substitute for oxygen demand in the water. Since mixing in the atmosphere is rapid and the atmosphere has 20% oxygen content, this source of oxygen is not the limiting factor in the MFCA process. Every oxygen molecule used at the air-cathode is one less oxygen molecule required from within the water. This will reduce the demand for aeration when organic material processing rates are high. The amount of this reduction in BOD is tied to the effectiveness of the air-cathode, but preliminary calculations indicate that when enough MFCA devices are present to cover 100% of the BOD aeration, about 10-25% of the oxygen demand will be met by MFC conversion.

In one embodiment, the MFCA is a stand-alone device that is tethered to, or sits in, the middle of a pond or other body of water. It is self-powered by the organic material in the water. Thus, it does not require an additional source of electricity from the power grid. This reduces the infrastructure costs of providing power to the edge of every pond or water body, the risks associated with running electricity into a body of water and the maintenance of that infrastructure system.

Reducing the costs of aeration may make a variety of products and processes more cost-effective and bring some new technologies to market. The energy costs of aeration are a large component of intensive aquaculture. Lower costs may improve the economics of some of the more sustainable fish farming approaches that are currently stymied by energy costs. Intensive algae farming has high costs associated with gas exchange for getting rid of oxygen and adding carbon dioxide. The MFCA could make some of those approaches more cost effective.

The MFC is configured so that the cathode is exposed to the air and the anode is submerged in anaerobic, organic-rich waters or sediments. In certain embodiments, the anode and cathode are separated by a proton permeable membrane, while in others, the protons simply flow through the body of water and the physical separation of the anode and cathode by a volume of water creates the same effect. In some embodiments, the water for the anode is supplied by an electric pump and may pass through one or more pre-concentration devices to increase the concentration of organic particles that arrive at the anode. The pumping system may also be configured to allow ambient bacteria and protists to remove the remainder of the dissolved oxygen before the water comes in contact with the anode.

The MFC makes low-voltage DC. An electricity management system provides the appropriate regulation of this current and conversion into other voltages and/or to AC to provide power to the other components of the system. The electricity management system may be connected to a public electrical grid and/or a battery. The electricity management system is also used to manage the data from sensors in the water, in the internal components of the system or other data sensors. These sensors feed data into the electricity management system that then control the other components of the system including the speed of pumps and aerators, the activity of pre-concentration devices, the current out to the grid, warning and alarms systems and other requirements.

The anode of the MFC requires contact with organic carbon-rich materials in an anaerobic fluid and a carbon management system is configured to ensure contact between the anode and the organic materials. In one embodiment, this is achieved by pumping water rich in organic materials into an anode chamber, either directly or after passing through one or more pre-concentration devices. In another embodiment, this is achieved by managing exposure of the anode to sediments rich in organic materials and organic rich pore-waters.

Electricity from the MFC is used, in part, to power one or more aeration or mixing systems of a variety of designs. This is designed too aerate or mix the surrounding waters without impacting the provision of anaerobic conditions to the anode. The aeration or mixing can be performed by any of a variety of standard devices that enhance the gas exchange between air and water. In one embodiment, this may be a simple motor-powered DC air pump that captures ambient air, compresses it and transfers it to a certain depth in the water to provide bubbles of air to the pond. In another embodiment, this can be a water pump that takes in water from either the anode or the ambient environment and pushes it into the air in small droplets, much like a fountain, or down into deeper water to aid in mixing. In yet another embodiment, the aeration or mixing device includes a paddle wheel or brush wheel driven by a DC motor that thrashes the surface of the water, both flinging droplets into the air and forcing bubbles into the water. In some embodiments, the movement of the water alone is adequate to improve gas exchange by bringing low oxygen water close to the surface.

In some embodiments, the air-cathode is maintained at the surface of the body of water to remain in contact with the air, while the anode and/or carbon management systems are in contact with the water or sediments. A flotation system is designed to maintain these configurations in the face of environmental fluctuations in the body of water.

Figure 6:
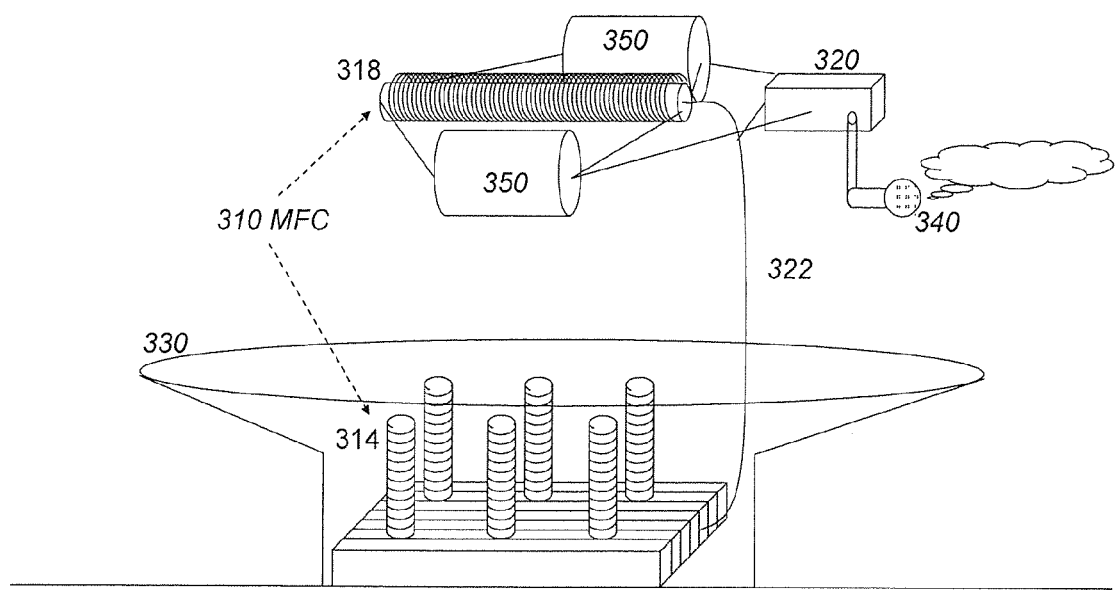
FIG. 6 is a schematic view of a sediment microbial fuel cell aerator in accordance with one embodiment of the invention.
Figure 7:
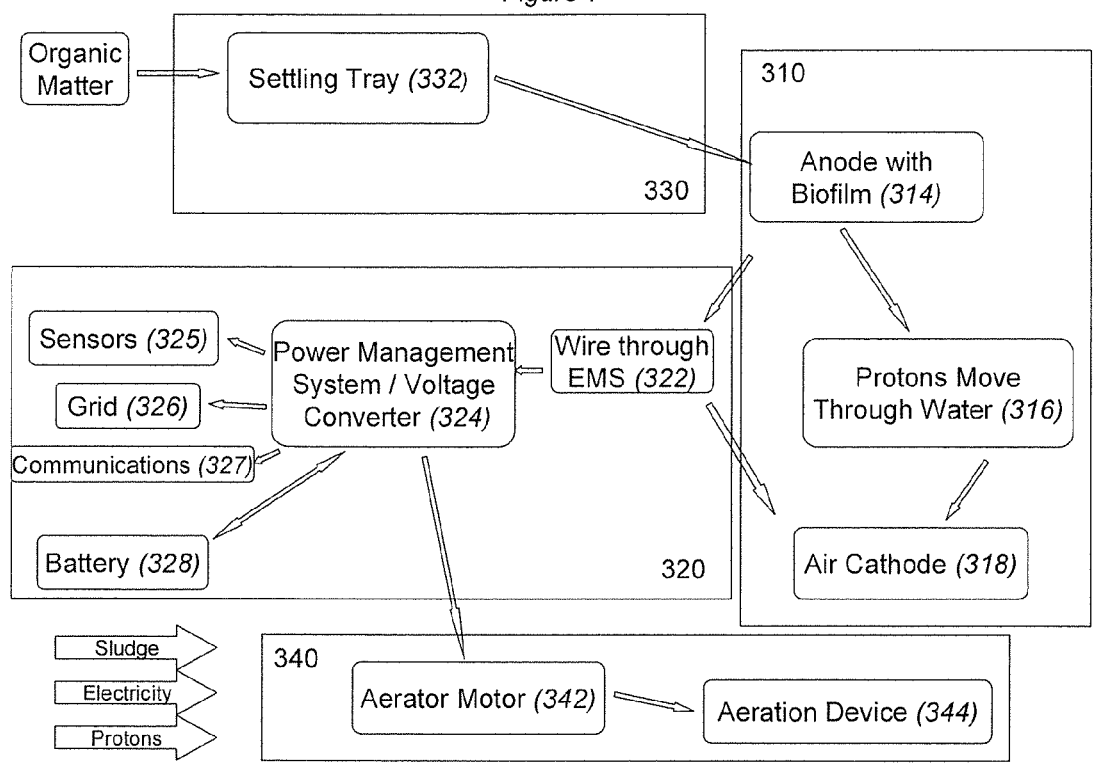
FIG. 7 is a flowchart showing the process that can be used to convert organic matter in sediments and pore-waters to electricity with the microbial fuel cell aerator of FIG. 6 in accordance with an embodiment of the invention.

The MFCA has different embodiments depending on the specific requirements, size, and shape of the pond or body of water in which it resides. Two embodiments, a floating microbial fuel cell aerator ("FMFCA), shown in FIGS. 2, 3, 4 and 5, and a sediment microbial fuel cell aerator ("SMFCA"), shown in FIGS. 6 and 7, are described below.

As shown in FIGS. 2, 3, 4 and 5, one embodiment of the MFCA is a floating microbial fuel cell aerator ("FMFCA"). The FMFCA 100 embodiment includes an MFC subsystem 110, an electricity management subsystem 120, a fluid management subsystem 130, an aerator subsystem 140, and a buoyancy management subsystem 150. In one embodiment, these parts are integrated into a single package. In one embodiment, the FMFCA 100 floats on the surface of a pond or other body of water with at least part of the FMFCA exposed to the air. In one embodiment, the FMFCA 100 is tethered into a desired location in the pond.

Figure 3:
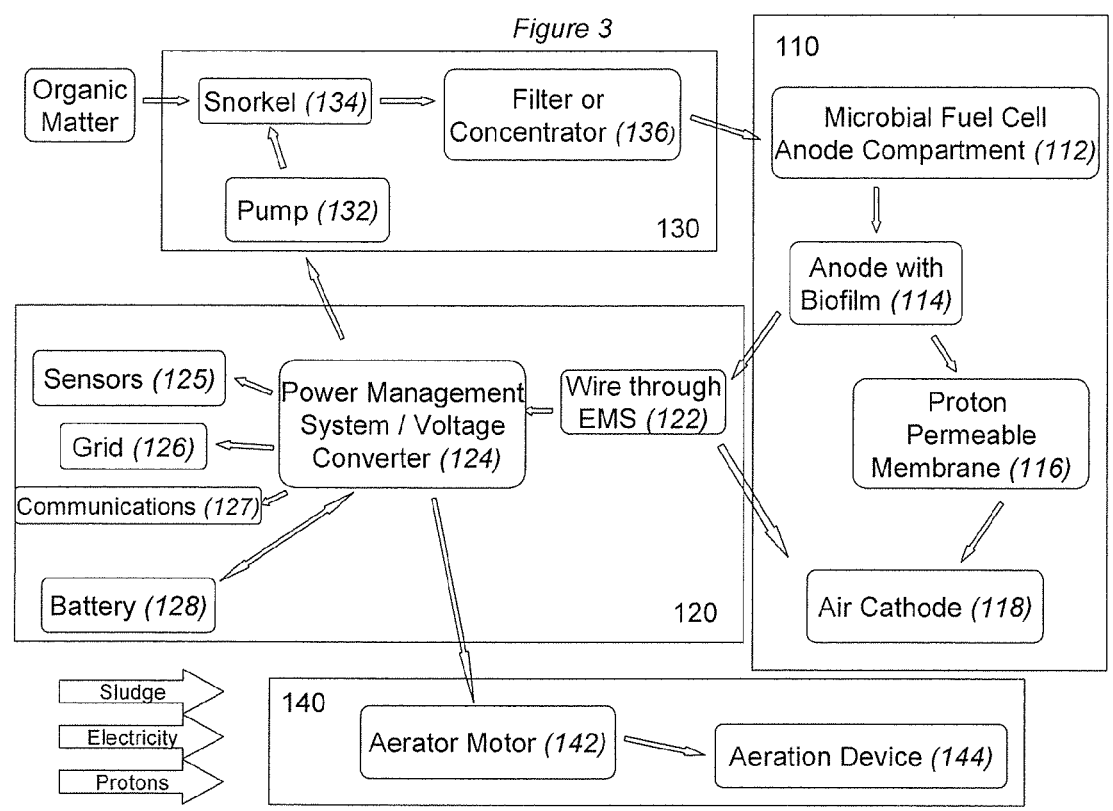
FIG. 3 is a flowchart showing the process that can be used to convert organic matter to electricity with the microbial fuel cell aerator of FIG. 2 in accordance with an embodiment of the invention.
Figure 4:
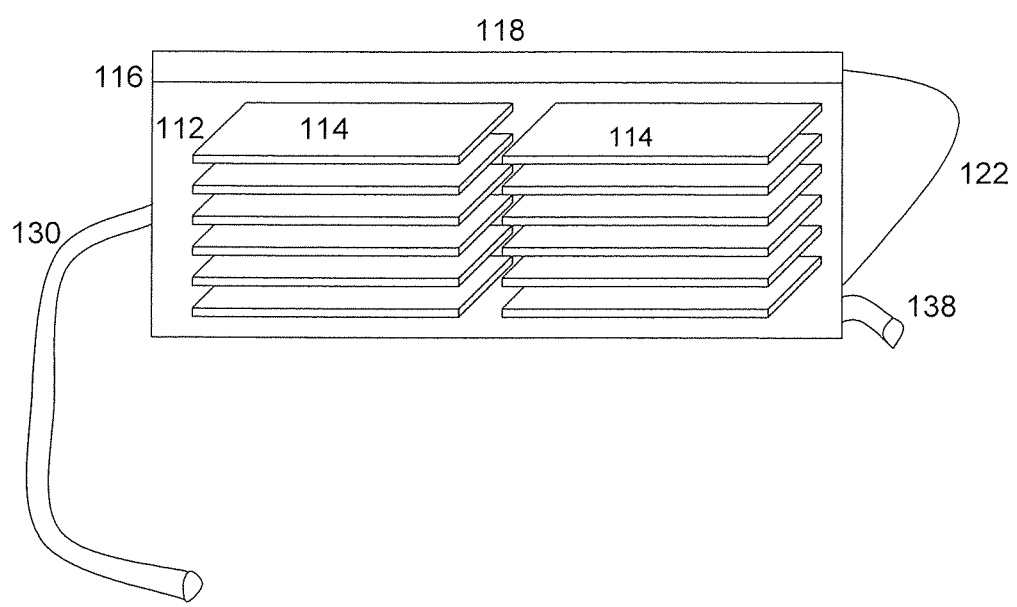
FIG. 4 is a schematic cross-sectional view of a microbial fuel cell containing a proton permeable membrane in accordance with an embodiment of the floating microbial fuel cell aerator of FIG. 2

As shown in FIGS. 3 and 4, the MFC subsystem 110 of the FMFCA 100 includes an anode chamber 112, an anode 114 and an air-cathode 118. In one embodiment, the anode 114 and the air-cathode 118 are separated by a proton permeable membrane 116.

The anode chamber 112 is configured to contain the anode 114, and is connected to the fluid management subsystem 130. The anode chamber 112 is enclosed to keep a water-tight separation between the fluid in the anode chamber and that in the pond in which it is located.

The anode 114 may be made from any of a variety of materials, including graphite plates or rods, carbon fiber cloths or wires, carbon or metal aerogels or other configurations that maximize the amount of surface area and the ability of the organic material-rich water to flow through the system. The anode 114 supports bacteria that respire organic material in the fluid. In one embodiment, the bacteria form a biofilm on the surface of the anode 114. The material for the anode 114 and the bacteria are selected to accommodate the best bacteria for the selected waters and organic material.

As shown in FIG. 4, the proton permeable membrane 116 is located on the upper surface of the anode chamber 112 and separates the anode chamber 112 and the air-cathode 118. The proton permeable membrane 116 allows protons to cross from the anode chamber 112 to the air-cathode 118.

In one embodiment, the proton permeable membrane 116 is coated with the air-cathode 118. The combination of the proton permeable membrane 116 and air-cathode 118 is made of a material having a high surface area that can both transfer protons and electrons and mediate the mixing of gaseous oxygen in air, protons crossing the proton permeable membrane 116 and electrons from the air-cathode 118. In one embodiment, the proton permeable membrane 116 and air cathode combination is made of a material selected from the group consisting of organic polymer membranes, carbon granules, fibers, aerogels, bacterial coatings and metal coatings such as platinum and other metals.

Figure 2:
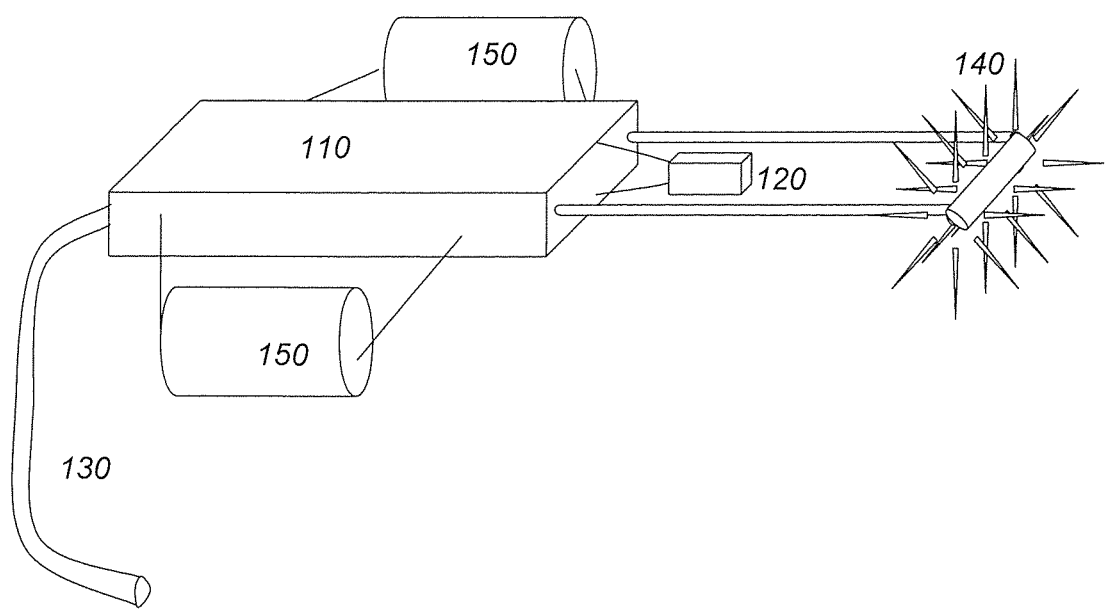
FIG. 2 is a schematic view of a floating microbial fuel cell aerator in accordance with an embodiment of the invention.

In the FMFCA 100 shown in FIGS. 2 and 4, the MFC subsystem 110 is designed so that the air-cathode 118 is exposed to the air and the anode chamber 112 that holds the anode 114 is submerged in organic-rich waters beneath the surface of a pond. In one embodiment of the device, the MFC subsystem 110 is arranged as a flat box that is wider and longer than it is deep, to maximize the surface area of the air-cathode 118 for a specific volume of the anode chamber 112. Other configurations where a larger anode volume is required can have any of a variety of shapes that keep the area of the air-cathode to an adequate size for the electron flow out into the atmosphere.

In the embodiment shown in FIGS. 2 and 3, the electricity management subsystem 120 includes a wire 122, a power management system 124, sensors 125, electrical grid 126, a communication device 127 and a battery 128.

The wire 122 electrically connects the anode 114 with the air-cathode 118.

The embodiment shown in FIG. 3 includes the battery 128 for storing power for later use. The battery 128 may be any suitable type of battery.

The communication device 127 allows the electricity management subsystem 120 to interact with other devices and sensors. The communication device 127 may be wired or wireless.

One or more sensors 125 collect information. In one embodiment, the electricity management subsystem 120 includes hardware and software that use information collected by the sensors 125 to modify the performance of the FMFCA 100. In some embodiments, these modifications can include changing the speed of various motors, turning part or all of the device on or off, reversing the direction of flow of a pump, signaling performance data to another device and other activities. In other embodiments of the device, it may run on other voltages or even alternating current.

In the embodiment shown in FIG. 3, the electricity management subsystem may be connected to the electrical grid 126 to provide electricity to the electrical grid 126 when the MFC subsystem 110 produces surplus electricity, and using electricity from the electrical grid 126 when more electricity is required to power the FMFCA 100.

In the FMFCA 100 shown in FIGS. 2, 3 and 4, the organic carbon management subsystem is the fluid management subsystem 130, which pre-processes and transfers organic carbon-rich ambient water to the anode chamber 112. The fluid management subsystem 130 includes a pump 132 that may be powered by the electricity management system 120. In certain embodiments, the fluid management subsystem 130 includes a snorkel 134 or other tube that draws water from a specific depth and pre-concentration devices 136 that increase the concentration of organic-rich particles in the water. In certain embodiments, the fluid management subsystem 130 includes embedded sensors that can measure internal and external conditions such as oxygen concentration, current flow, clogging or other performance related characteristics.

In the embodiment shown in FIG. 3, the fluid management subsystem 130 includes a filter or concentrator 136 to ensure that the water that flows into the anode chamber 112 is fit to be processed by the bacteria.

In the embodiment shown in FIG. 4, the fluid management subsystem 130 includes a fluid outflow 138 to remove excess fluid, such as water, from the anode chamber 112.

In the embodiment shown in FIGS. 2 and 3, the aerator subsystem 140 includes an aerator motor 142 that drives an aeration device 144. In the embodiment shown in FIG. 2, the aeration device 144 is a brush wheel.

Figure 5:
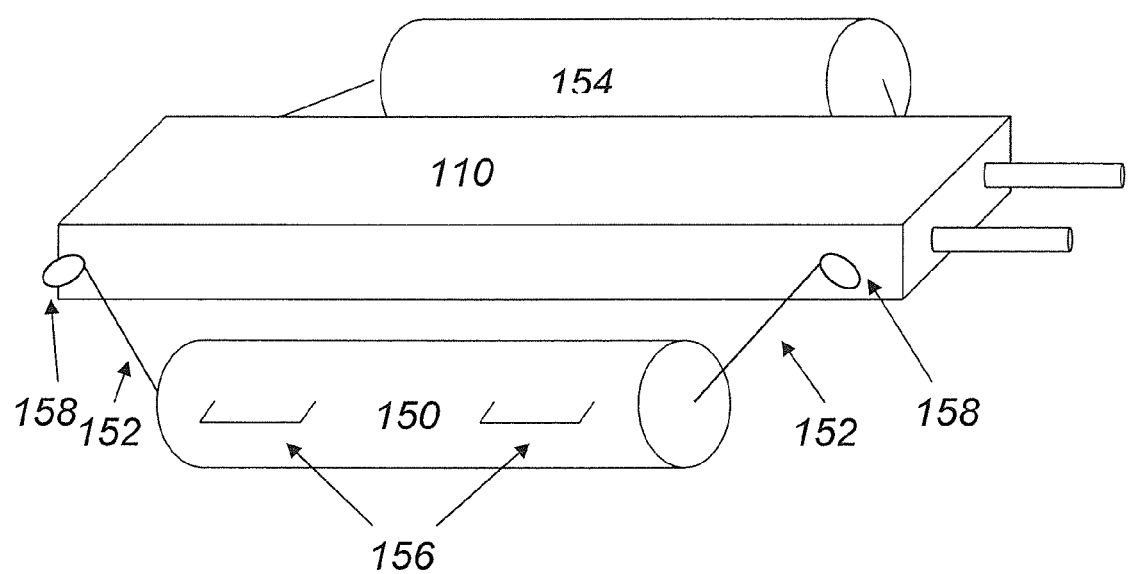
FIG. 5 is a schematic illustration of the components of the buoyancy management system of FIG. 2 in accordance with an embodiment of the invention.

In one embodiment of the FMFCA 100 shown in FIG. 2, the buoyancy management subsystem 150 shown in FIG. 5 includes a frame 152 to hold the other subsystems 110, 120, 130 and 140 in the best configuration, floats 154 that provide enough buoyancy to hold the FMFCA 100 at the proper water level, hand-holds 156 for moving the FMFCA 100 in and out of the water and tethers 158 that allow the FMFCA 100 to be safely tethered.

During operation of the FMFCA 100, the bacteria respire organic material in the anode chamber 112 and produce electrons and protons. As shown in FIG. 3, the protons enter the air-cathode 118 via the proton permeable membrane 116. The electrons are collected at the anode 114 and flow through the wire 122 to the air-cathode 118. Gaseous oxygen from atmospheric air, protons crossing the proton permeable membrane 116 and electrons from the air-cathode 118 combine at the air-cathode 118 to produce water. The flow of electrons from the anode 114 to the air-cathode 118 produces low-voltage direct current ("DC").

In the embodiment shown in FIG. 3, the electricity management subsystem 120 converts the low-voltage DC produced by the MFC subsystem 110 into a current required by the fluid management subsystem 130 and/or the aerator subsystem 140. The electricity management subsystem 120 also manages the quality and flow of electricity and includes the power management system 124 that is programmed or hard-wired to ensure that the FMFCA 100 functions as intended.

In one embodiment, the electricity management subsystem 120 converts low voltage DC produced by the MFC subsystem 110 to 12 volts and shunts the current to run a 12 volt pump 132 in the fluid management subsystem 130 and/or a 12 volt motor 142 in the aerator subsystem 140. The electricity management subsystem 120 also diverts a small amount of the power to cover the energy needs of the power management system 124 including micro-processors and switches that manage the functions of the electricity management subsystem 120.

The SMFCA 300 shown in FIGS. 6 and 7 includes the components of an MFC subsystem 310 including the MFC anode 314 and the MFC air-cathode 318, an electricity management subsystem 320, an organic material collection subsystem 330, an aerator subsystem 340 and a buoyancy management subsystem 350.

In the SMFCA device shown in FIGS. 6 and 7, the MFC subsystem 310 is similar in principle to that of the MFC subsystem 110 of the FMFCA 100 described above. The MFC subsystem 310 includes an anode 314 and an air-cathode 318. The MFC subsystem 310 shown in FIGS. 6 and 7 is designed so that the air-cathode 318 floats on the surface of the water and is exposed to the air. The anode 314 is embedded in the sediment at the bottom of the pond or body of water so that sediment rich in organic material falls onto, covers, and surrounds the anode 314.

The anode 314 and air-cathode 318 can have a variety of designs based on the specific application. In one embodiment, the anode 314 consists of graphite plates, rods, cloths, or other materials arrayed in such a way as to maximize the surface area in close contact with the organic material. This type of anode may be wrapped in wires or have wires embedded in the conducting materials to improve electron flow. The anode will be of any shape that maximizes the contact with organic-rich sediments and pore-waters and the exchange of pore-water to retain a steady supply of new organics in contact with the anode surface. In some embodiments, the anode is designed as an integral part of a sediment collection system in the organic carbon management subsystem 330 that pre-concentrates the sinking particles and focuses them around the anode. This may be a simple conical device or in more complex pond designs, a hydrodynamic system that has areas of high turbulence to keep most particles suspended and strategic areas of low turbulence where the organic particles preferentially settle. In these designs, the anode would be arrayed in the areas of low turbulence so that the particles settled in and around the anode.

In one embodiment, the air cathode 318 is made of a material selected from the group consisting of organic polymer membranes, carbon granules, fibers, sheets, aerogels, and metal coatings such as platinum and other metals.

The electricity management subsystem 320 includes a wire 322, a power management system 324, one or more sensors 325, an electrical grid 326, a communication device 327 and a battery 328.

The wire 322 electrically connects the anode 314 with the air-cathode 320, and carries electricity from the anode 314 at the bottom of the pond to the air-cathode 320 floating on the surface of the pond.

The power management system 324, sensors 325, electrical grid 326, communication device 327 and battery 328 are substantially similar to the power management system 124, sensors 125, electrical grid 126, communication device 127 and battery 128 as described above in reference to FMFCA 100 in FIG. 3.

As shown in FIGS. 6 and 7, the organic carbon management subsystem 330 gathers sediment containing organic material from a large area so that it will come into contact with the anode 314. Because the anode 314 is embedded in the sediment and must be covered and surrounded by organic material, it is necessary that as much organic material as possible settle on the anode 314. In the embodiment shown in FIGS. 6 and 7, the organic carbon management subsystem 330 includes a settling tray 332, which consists of a large, gently sloping surface that operates much like a funnel to direct falling organic material towards the anode 314. The settling tray 332 may be made of any suitable material. In one embodiment, the settling tray is made of plastic. In another embodiment, the organic carbon management subsystem 330 includes pumps and tubes that suck in organic material from other areas of the pond and deliver the organic material to the anode 314. In one embodiment, the organic carbon management subsystem 330 is unnecessary when the anode 314 is located where organic material naturally, or by engineered design, collects in a certain area of the pond or body of water.

In the embodiment shown in FIG. 6, the buoyancy management subsystem 350 is largely the same as the buoyancy management subsystem 150 illustrated in FIG. 5. It includes a frame 152 to hold the other subsystems 310, 320, 330 and 340 in the best configuration, floats 154 that provide enough buoyancy to hold the SMFCA 300 at the proper water level, hand-holds 156 for moving the SMFCA 300 in and out of the water and tethers 158 that connect to the anode 314.

During operation of the SMFCA 300, the bacteria respire organic material at the anode 314 and produce electrons and protons. As shown in FIG. 7, the protons flow through the water to the air-cathode 318. Because the sediment at the anode 314 and the air at the air-cathode 318 exchange water slowly, no proton permeable membrane is required. The electrons are collected at the anode 314 and flow through the wire 322 to the air-cathode 318. Gaseous oxygen from atmospheric air, protons flowing through the water and electrons from the air-cathode 318 combine at the air-cathode 318 to produce water. The flow of electrons from the anode 314 to the air-cathode 318 produces low-voltage direct current ("DC").

Although limited embodiments of the MFCA have been specifically described and illustrated herein, many modifications and variations will be apparent to those skilled in the art. Accordingly, it is to be understood that the MFCA constructed according to principles of this invention may be embodied other than as specifically described herein. The invention is also defined in the following claims.

What is claimed is:

1. A device for mixing and aerating a body of water, the device comprising:
   a microbial fuel cell comprising an anode and a cathode;
   an electricity management subsystem electrically connecting the anode and the cathode; and
   a mixing subsystem electrically connected to the electricity management subsystem,
   wherein the mixing subs stem comprises an apparatus selected from the group consisting of air pumps, paddle wheels, brush wheels and combinations thereof.

2. The device according to claim 1, wherein the mixing subsystem comprises an aerating apparatus or a mixing apparatus.

3. The device according to claim 1, further comprising an organic material management subsystem.

4. The device according to claim 3, wherein the organic material management subsystem comprises a pump and pre-concentration devices.

5. A device for mixing and aerating a body of water, the device comprising:
   a microbial fuel cell comprising an anode and a cathode;
   an electricity management subsystem electrically connecting the anode and the cathode;
   a mixing subsystem electrically connected to the electricity management subsystem; and
   an organic material management subsystem,
   wherein the organic material management subsystem comprises a settling tray.

6. A device for mixing and aerating a body of water, the device comprising:

a microbial fuel cell comprising an anode and a cathode;

an electricity management subsystem electrically connecting the anode and the cathode;

a mixing subsystem electrically connected to the electricity management subsystem; and a buoyancy management subsystem.

7. The device according to claim 1, wherein the cathode is exposed to air.

8. The device according to claim 1, wherein the microbial fuel cell further comprises a proton permeable membrane.

9. A method for mixing a body of water using a device, the device comprising:

a microbial fuel cell comprising an anode and a cathode, an electricity management subsystem electrically connecting the anode and the cathode, and a mixing subsystem electrically connected to the electricity management subsystem, wherein the mixing subsystem comprises an apparatus selected from the group consisting of air pumps, paddle wheels, brush wheels and combinations thereof; the method comprising:

providing bacteria to the anode, providing organic material to the bacteria at the anode, allowing the bacteria to produce electrons at the anode, and powering the mixing subsystem with electricity flowing from the anode to the cathode through the electricity management subsystem.

10. The method of claim 9, wherein the organic material is provided by the body of water.

\* \* \* \* \*